(12) United States Patent
Tsurumi

(10) Patent No.: US 8,042,656 B2
(45) Date of Patent: Oct. 25, 2011

(54) DISK BRAKE

(75) Inventor: Satoru Tsurumi, Minami-Alps (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 11/790,008

(22) Filed: Apr. 23, 2007

(65) Prior Publication Data

US 2007/0251772 A1    Nov. 1, 2007

(30) Foreign Application Priority Data

Apr. 28, 2006 (JP) .................. 2006-126882

(51) Int. Cl.
*F16D 65/40* (2006.01)
(52) U.S. Cl. ............. 188/73.38; 188/73.37; 188/73.31
(58) Field of Classification Search .......... 188/73.37, 188/73.38, 73.31, 73.32
See application file for complete search history.

(56) References Cited

U.S. PATENT DOCUMENTS

| | | | | |
|---|---|---|---|---|
| 4,196,794 A | * | 4/1980 | Matsumoto | 188/73.37 |
| 5,687,817 A | * | 11/1997 | Kobayashi et al. | 188/72.3 |
| 5,699,882 A | * | 12/1997 | Ikegami et al. | 188/73.38 |
| 5,901,815 A | * | 5/1999 | Kobayashi et al. | 188/7 |
| 5,941,348 A | * | 8/1999 | Matsumoto et al. | 188/73.38 |
| 5,947,233 A | * | 9/1999 | Kobayashi et al. | 188/72.3 |
| 6,003,642 A | * | 12/1999 | Mori et al. | 188/73.44 |
| 6,378,666 B1 | * | 4/2002 | Yoko | 188/73.38 |
| 6,634,469 B2 | * | 10/2003 | Storzel et al. | 188/73.38 |
| 7,163,089 B2 | * | 1/2007 | Nogiwa | 188/73.38 |
| 7,219,773 B2 | * | 5/2007 | Ono | 188/73.38 |

FOREIGN PATENT DOCUMENTS

| | | |
|---|---|---|
| JP | 48-41166 | 6/1973 |
| JP | 2003-222171 | 8/2003 |
| JP | 2004-218696 | 8/2004 |
| JP | 2006-153233 | 6/2006 |

OTHER PUBLICATIONS

Japanese Office Action (English translation) issued Jul. 13, 2010 in corresponding Japanese Application No. 2006-126882.

* cited by examiner

*Primary Examiner* — Robert Siconolfi
*Assistant Examiner* — Mariano Sy
(74) *Attorney, Agent, or Firm* — Wenderoth, Lind & Ponack, L.L.P.

(57) ABSTRACT

The strength and rigidity of pad springs are increased with a simple structure to prevent deformation and so forth of the pad springs caused by external force. A mounting member is provided with pad springs for resiliently supporting friction pads. Each pad spring has guide plates, a connecting plate, an engagement plate, radially urging portions, circumferentially urging portions, reinforcement, etc. The reinforcement includes a rectilinear reinforcement formed on a flat plate portion of the connecting plate by embossing, for example, and oblique reinforcements formed on joint portions of the connecting plate. Thus, the joint portions and so forth of the pad springs can be prevented from being deformed by external force when the brake is activated or during assembling operation, for example, and hence it is possible to prevent positional displacement of the guide plates, etc. that would otherwise be caused by the deformation of the joint portions.

11 Claims, 12 Drawing Sheets

DISK BRAKE

BACKGROUND OF THE INVENTION

I. Technical Field

The present invention relates to a disk brake suitably used to apply braking force to a vehicle, for example, an automobile.

II. Description of the Related Art

In general, a disk brake provided on a vehicle, e.g. an automobile is arranged as follows. When the driver of the vehicle or the like conducts a braking operation, inner and outer friction pads are pressed against both sides of a disk, thereby applying braking force to the disk (for example, see Japanese Patent Application Publication No. 2003-222171).

This type of conventional disk brake includes a mounting member secured to a non-rotating part of a vehicle. The mounting member has a pair of arms spaced apart from each other in the rotational direction of a disk. The pair of arms extends over the outer periphery of the disk in the axial direction of the disk. The arms are provided with pad guides formed, for example, from U-grooves.

A caliper is provided on the arms of the mounting member slidably in the axial direction of the disk. A pair of friction pads is slidably fitted in the pad guides of each arm. The friction pads are adapted to be pressed against both sides of the disk by the caliper. Two (for example) pad springs are attached respectively to the arms of the mounting member to resiliently support the pair of friction pads between the arms and to guide the friction pads in the axial direction of the disk.

Each pad spring is formed in a U shape as a whole from a resilient metal plate, for example, and disposed to extend over the outer periphery of the disk in the axial direction thereof from one (inner) side to the other (outer) side of the disk. The pad spring has a pair of guide plates positioned at the inner and outer sides, respectively, of the disk and fitted into the respective pad guides of the mounting member and a connecting plate extending over the outer periphery of the disk in the axial direction thereof and connected at both ends thereof to the pair of guide plates.

The guide plates resiliently support the friction pads, respectively, in the pad guides of the mounting member, thereby suppressing rattling of the friction pads and allowing smooth sliding displacement thereof. The connecting plate integrally connects together the inner and outer guide plates.

The above-described conventional technique uses substantially U-shaped pad springs to support the inner and outer friction pads. This conventional structure, however, involves some problems arising as the slidability of the friction pads relative to the pad springs deteriorates with age. That is, if the friction pads are caused to return away from the disk due to run-out of the disk rotating at idle during non-braking operation, external forces are applied to the guide plates of each pad spring in directions in which the guide plates are pulled away from the disk, together with the friction pads returned away from the disk.

The external forces urge the guide plates of the pad spring to move away from each other, and act as forces that pull the opposite ends of the connecting plate away from each other. In this regard, if the strength and rigidity of the joints between the guide plates and the connecting plate are not sufficiently high, the joints are elastically deformed. The elastic deformation of the joints undesirably causes the friction pads to be always pressed toward the disk. The friction pads thus pressed may drag against the disk, which causes brake noise or judder. Thus, insufficient strength and rigidity of the joints between the guide plates and the connecting plate lead to degradation of the function and durability of the pad spring.

The present invention has been made in view of the above-described problems with the conventional techniques. Accordingly, an object of the present invention is to provide a disk brake capable of satisfactorily increasing the strength of pad springs to prevent deformation thereof and to improve the durability and reliability thereof without the need to substantially change the configuration and the like of the pad springs.

SUMMARY OF THE INVENTION

To solve the above-described problems, the present invention is applied to a disk brake including a mounting member having a pair of arms spaced apart from each other in the rotational direction of a disk. The arms extend over the outer periphery of the disk in the axial direction of the disk. The arms are provided with pad guides. A caliper is provided on the mounting member slidably in the axial direction of the disk. A pair of friction pads is slidably fitted to the arms of the mounting member through the pad guides. The friction pads are adapted to be pressed against both sides of the disk by the caliper. Pad springs are attached to the arms, respectively, of the mounting member to resiliently support the friction pads between the arms.

In the disk brake of the present invention, the pad springs each include a pair of guide plates positioned in the pad guides, respectively, of the mounting member at the axially opposite sides of the disk to guide the pair of friction pads in the axial direction of the disk. Each pad spring further includes a connecting plate having a flat plate portion extending in the axial direction of the disk over the outer periphery thereof and two joint portions located at the opposite ends of the flat plate portion and joined to the pair of guide plates. Further, each pad spring has reinforcements provided on at least the two joint portions of the connecting plate to reinforce the joint portions.

According to the present invention, the reinforcements may be formed from recessed projections.

According to the present invention, the reinforcements may be provided on the flat plate portion and the two joint portions of the connecting plate.

According to the present invention, the reinforcements may include a rectilinear reinforcement rectilinearly provided on the flat plate portion of the connecting plate and oblique reinforcements respectively provided on the two joint portions of the connecting plate to extend obliquely from the opposite ends of the rectilinear reinforcement toward the guide plates.

DETAILED DESCRIPTION OF THE INVENTION

Disk brakes according to embodiments of the present invention will be described below in detail with reference to the accompanying drawings.

FIGS. 1 to 8 show a first embodiment of the present invention. In this embodiment, a disk brake for use in an automobile will be explained by way of example.

Figure 1:
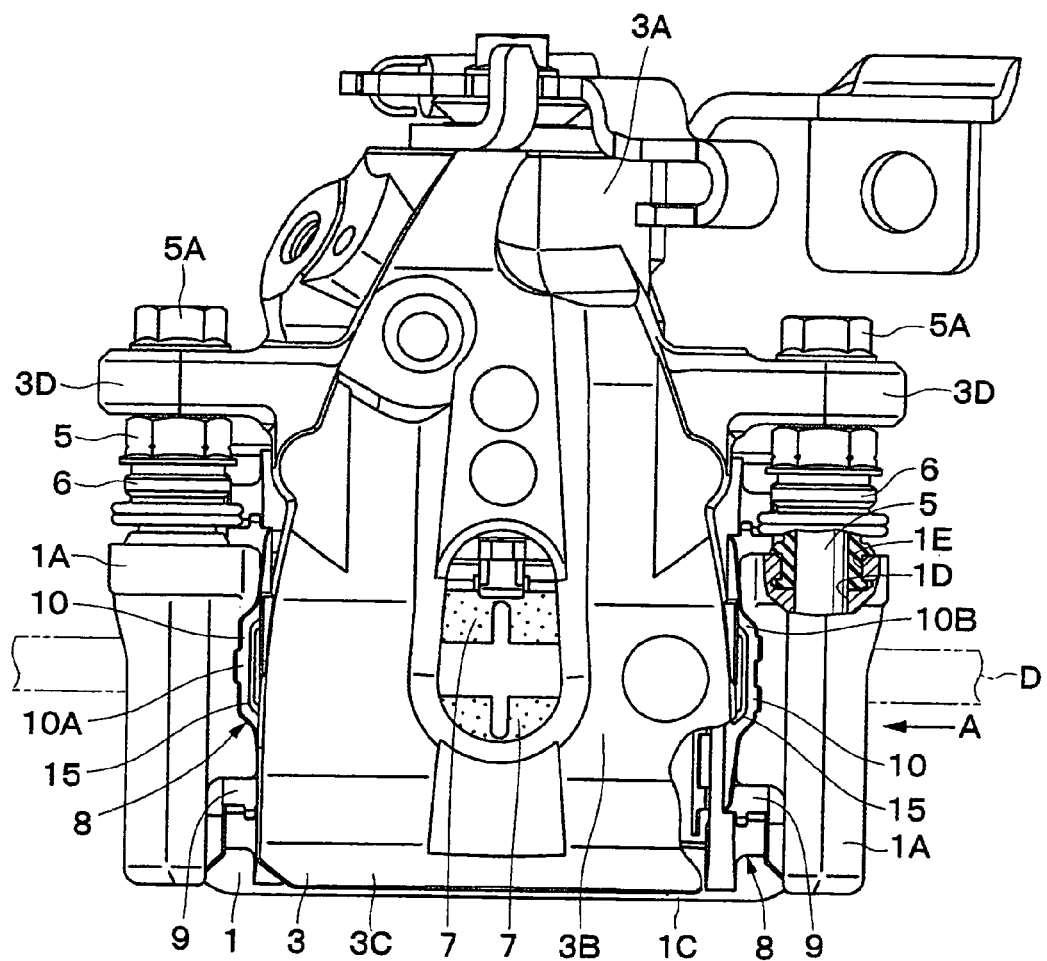
FIG. 1 is a general view of a disk brake according to a first embodiment of the present invention.
Figure 2:
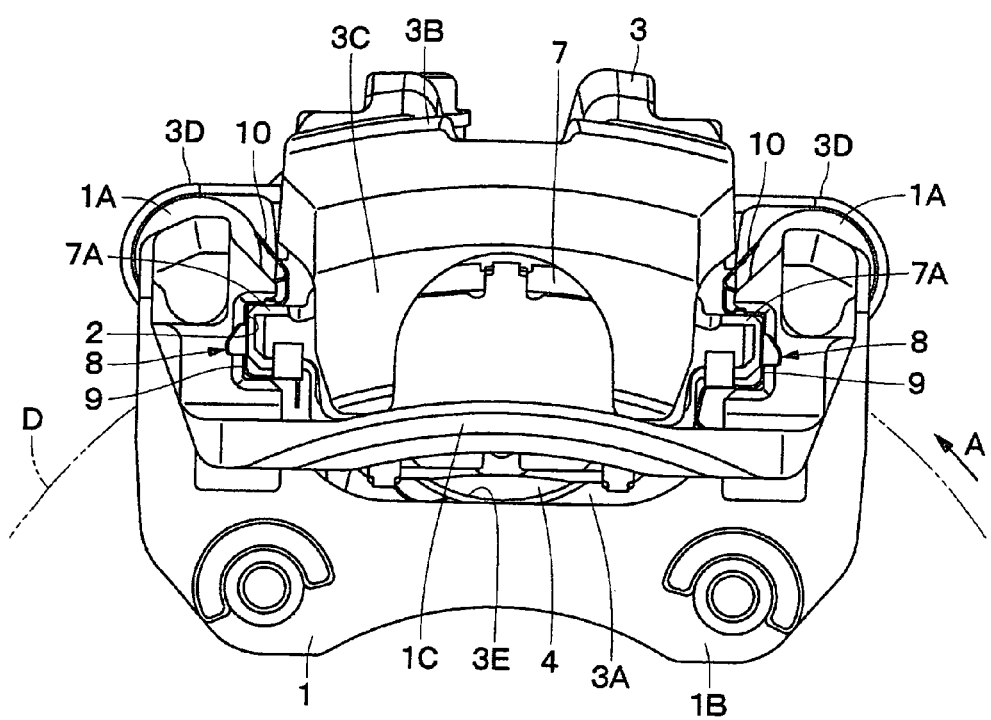
FIG. 2 is a bottom-view of the disk brake in FIG. 1 as seen from the outer side thereof.

In the figures, a mounting member 1 is secured to a non-rotating part of a vehicle. As shown in FIGS. 1 and 2, the mounting member 1 is positioned near a disk D that rotates in the direction of the arrow A, together with a wheel (not shown) of the vehicle. In this case, the disk D rotates in the arrow A direction when the vehicle runs in the forward direction.

The mounting member 1 consists essentially of a pair of arms 1A, 1A, a mounting seat portion 1B, and a bow-shaped reinforcing beam 1C. The arms 1A are spaced apart from each other in the rotational (circumferential) direction of the disk D and extend over the outer periphery of the disk D in the axial direction of the disk D. The mounting seat portion 1B connects together the proximal ends of the arms 1A and is secured to the non-rotating part of the vehicle at the inner side of the disk D. The reinforcing beam 1C connects together the distal ends of the arms 1A.

The arms 1A are provided with respective pin holes 1D (only one of them is shown) in which sliding pins 5 (described later) are slidably fitted, respectively. Each pin hole 1D is open on the end surface of the arm 1A. The pin hole 1D is enlarged in diameter at the open end thereof to form an annular boot fitting groove 1E surrounding the pin hole 1D. The distal end portion of a protective boot 6 (described later) is fitted in the boot fitting groove 1E. Thus, the portion of each arm 1A in which the protective boot 6 is fitted has an outer diameter larger than that of the rest of the arm 1A by an amount corresponding to the boot fitting groove 1E.

Each arm 1A has inner pad guides 2, 2 (described later) formed at one (inner) of the axially opposite sides of the disk D and outer pad guides 2, 2 at the other (outer) of the axially opposite sides (only the outer pad guides are shown).

The pad guides 2 are provided on the inner and outer sides, respectively, of each arm 1A of the mounting member 1. The pad guides 2 are fitted with projections 7A of friction pads 7 (described later) through pad springs 8, respectively. Thus, the pad guides 2 guide the friction pads 7 in the axial direction of the disk D when the brakes are applied or released.

Figure 3:
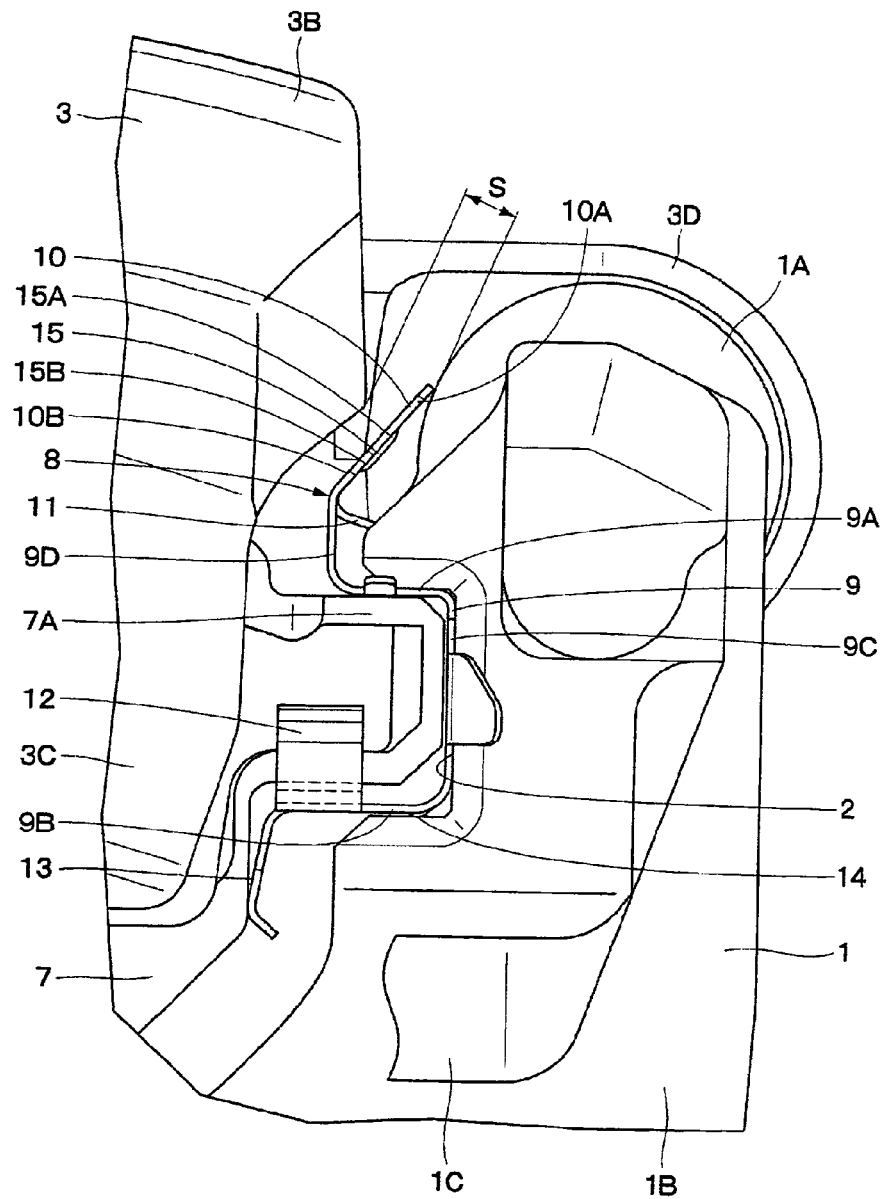
FIG. 3 is a fragmentary enlarged view showing a pad guide, a pad spring and their vicinities in FIG. 2.

As shown in FIGS. 2 and 3, the pad guides 2 are formed as U-grooves having a U-shaped sectional configuration, for example, and extend in the axial direction of the disk D. The bottoms of the grooves constituting the pad guides 2 function as torque receiving portions that bear braking torque applied to the friction pads 7 from the disk D during a braking operation through the projections 7A.

A caliper 3 is slidably provided on the mounting member 1. As shown in FIGS. 1 and 2, the caliper 3 has an inner leg portion 3A provided at one side (inner side) of the disk D, a bridge portion 3B extending from the inner leg portion 3A to the other side (outer side) of the disk D over the outer periphery of the disk D between the arms 1A of the mounting member 1, and an outer leg portion 3C extending radially inward of the disk D from the distal (outer) end of the bridge portion 3B and bifurcated at the distal end thereof.

The inner leg portion 3A is provided with a pair of mounting portions 3D, 3D projecting leftward and rightward, respectively, in FIG. 1. The mounting portions 3D are slidably supported by the arms 1A of the mounting member 1 through respective sliding pins 5 (described later). As shown in FIG. 2, the inner leg portion 3A is provided with a cylinder 3E that is externally supplied with a brake fluid pressure. A piston 4 is slidably fitted in the cylinder 3E.

There are provided two (for example) sliding pins 5 between the mounting member 1 and the caliper 3. The sliding pins 5 are, as shown in FIG. 1, fastened at the proximal ends thereof to the mounting portions 3D of the caliper 3 by using bolts 5A, etc. The distal ends of the sliding pins 5 are slidably fitted in the respective pin holes 1D of the arms 1A of the mounting member 1. Thus, the caliper 3 is slidably supported by the mounting member 1 through the sliding pins 5.

Protective boots 6 are provided between the sliding pins 5 and the arms 1A of the mounting member 1. The protective boots 6 are each formed from an elastic material, e.g. rubber, in the shape of an axially extensible tubular member. The protective boots 6 are fitted on the respective outer peripheries of the sliding pins 5 to seal between the outer peripheral surfaces of the sliding pins 5 and the pin holes 1D of the mounting member 1. More specifically, the protective boots 6 are secured at their proximal ends to the outer peripheries of the sliding pins 5 and fitted at their distal ends into the boot fitting grooves 1E of the arms 1A of the mounting member 1.

Inner and outer friction pads 7 are positioned at the opposite (inner and outer) sides of the disk D. Each friction pad 7 is formed, for example, as a substantially fan-shaped plate member extending in the rotational direction of the disk D. As shown in FIGS. 2 and 3, each friction pad 7 has substantially quadrangular projections 7A at the longitudinally opposite ends of the back side (backing plate) thereof.

The projections 7A are spaced apart from each other in the rotational direction of the disk D. The projections 7A are slidably fitted in the pad guides 2, respectively, of the mounting member 1 with guide plates 9 of pad springs 8 (described later) interposed therebetween. In this state, each projection 7A is resiliently supported (held) between a top plate 9A and a radially urging portion 12 of the associated pad spring 8.

During a braking operation, the inner and outer friction pads 7 are pressed against both sides of the disk D by the caliper 3. At this time, the projections 7A are slidingly displaced along the pad guides 2 in the axial direction of the disk D. During the braking operation, each friction pad 7 receives braking torque from the disk D. The braking torque causes the projection 7A to be pressed against the groove bottom of the pad guide 2 through the guide plate 9 (side plate 9C) of the pad spring 8. Thus, the braking torque is borne by the mounting member 1.

A pair of pad springs 8 is provided on the arms 1A, respectively, of the mounting member 1. The pad springs 8 are disposed at the opposite side across the friction pads 7 in the rotational direction of the disk D to resiliently support the inner and outer friction pads 7 and to allow smooth sliding displacement of the friction pads 7.

Figure 4:
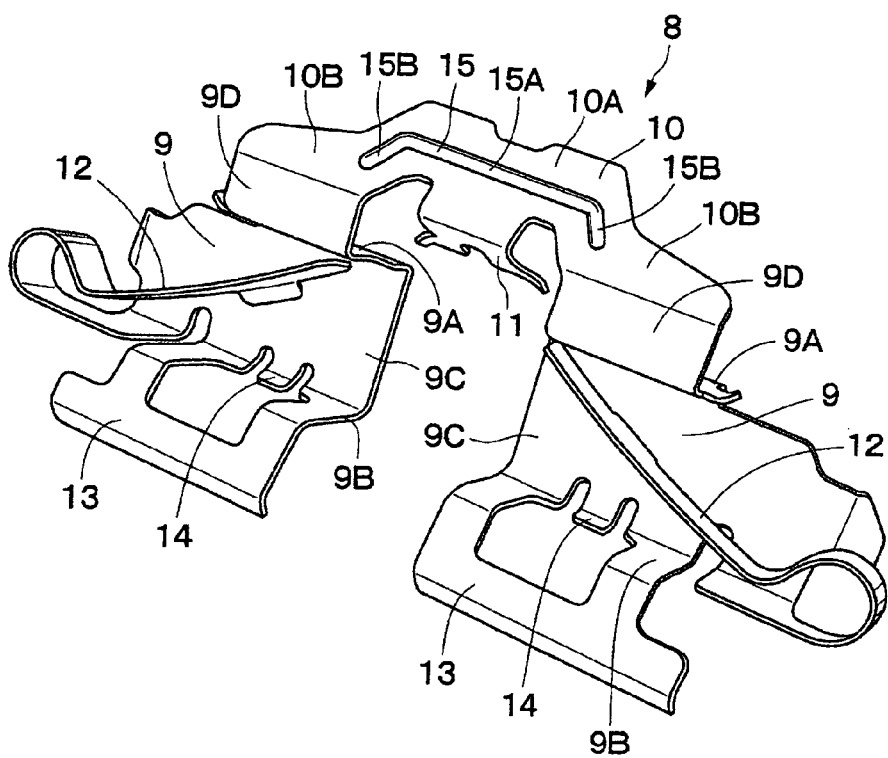
FIG. 4 is a perspective view of a pad spring as a single element.
Figure 5:
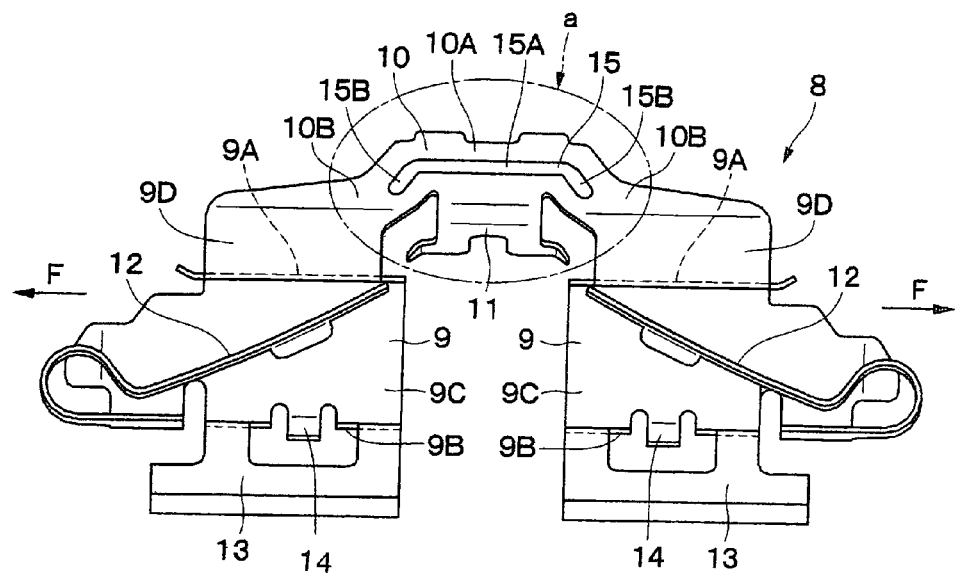
FIG. 5 is a front view of the pad spring.
Figure 6:
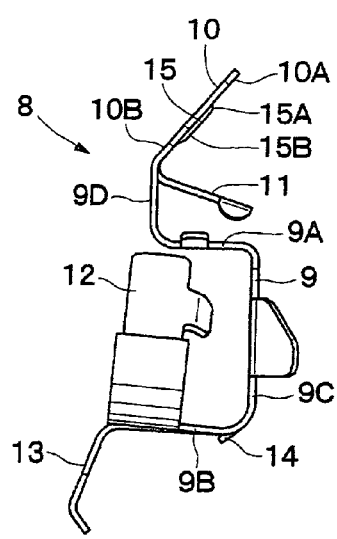
FIG. 6 is a side view of the pad spring in FIG. 5 as seen from the right side thereof

The pad springs 8 are, as shown in FIGS. 4 to 6, each integrally formed as a substantially U-shaped plate member by bending a resilient stainless steel plate, for example, by press working or other method. The pad springs 8 extend over the outer periphery of the disk D from one side to the other of the disk D (i.e. from the inner side to the outer side of the disk D). The pad springs 8 each have guide plates 9, 9, a connecting plate 10, radially urging portions 12, 12, circumferentially urging portions 13, 13, reinforcement 15, etc., which will be described below.

A pair of guide plates 9 is provided at the axially opposite sides, respectively, of the disk D to guide the friction pads 7 in the axial direction of the disk D. As shown in FIG. 3, the guide plates 9 are bent in a substantially U shape or "]" shape, for example, and fitted in the pad guides 2, respectively, of the mounting member 1 to axially slidably support the projections 7A of the friction pads 7.

The guide plates 9 each have a top plate 9A provided at a radially outer position in the associated pad guide 2 as viewed in the radial direction of the disk D, a bottom plate 9B provided at a radially inner position in the pad guide 2, a side plate 9C connecting between the top plate 9A and the bottom plate 9B and placed to abut against the groove bottom of the pad guide 2, and a rising plate 9D rising from the end of the top plate 9A radially outward of the disk D along the arm 1A of the mounting member 1, being bent in a substantially L shape. The top plate 9A, the bottom plate 9B and the side plate 9C surround the projection 7A of the friction pad 7 in the pad guide 2.

A connecting plate 10 is provided between the inner and outer guide plates 9. As shown in FIG. 3, the connecting plate 10 is positioned, for example, in a gap S between the arm 1A of the mounting member 1 and the bridge portion 3B of the caliper 3. At this position, the connecting plate 10 connects the inner and outer guide plates 9 to each other.

The connecting plate 10 is, as shown in FIGS. 4 and 5, formed from an elongated plate material or the like having a substantially U-shaped (or "]"-shaped) outer shape, for example. The connecting plate 10 is joined to the rising plates 9D of the guide plates 9 in the state of obliquely bent relative to the rising plates 9D. The connecting plate 10 has a rectilinear flat plate portion 10A extending in the axial direction of the disk D from one side to the other side thereof over the outer periphery of the disk D and two joint portions 10B integrally formed at the longitudinally opposite ends of the flat plate portion 10A and joined to the inner guide plate 9 and the outer guide plate 9, respectively.

Figure 7:
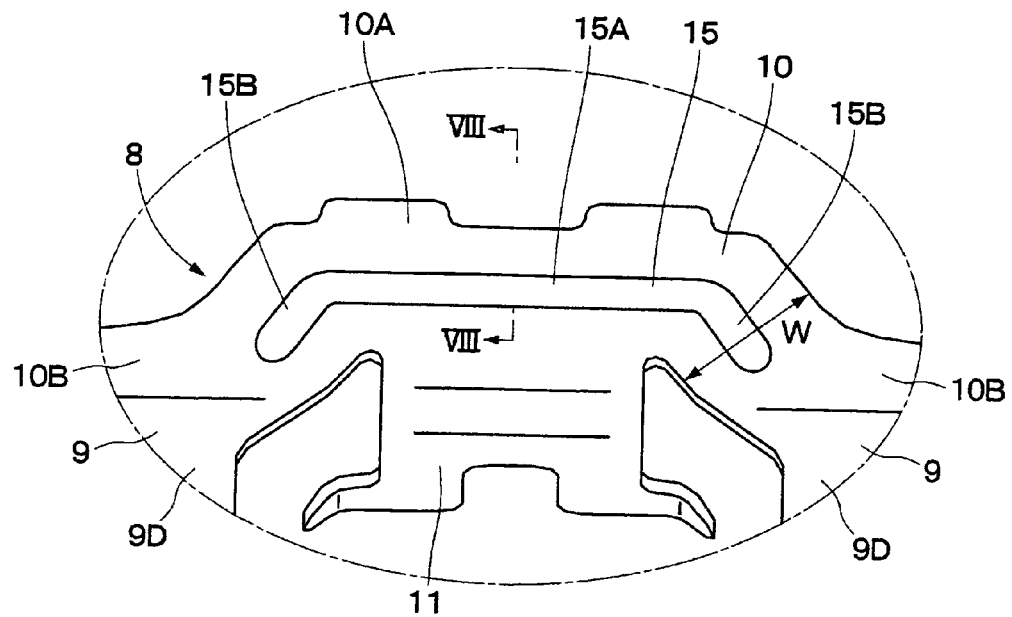
FIG. 7 is a fragmentary enlarged view of part a in FIG. 5.

The flat plate portion 10A has an engagement plate 11 (described later) integrally formed thereon at the middle in the longitudinal direction thereof. The two joint portions 10B are, as shown in FIG. 7, bent from the opposite ends of the flat plate portion 10A radially inward of the disk D in a substantially "<" shape and extend obliquely relative to the extension direction of the flat plate portion 10A (i.e. the axial direction of the disk D).

The joint portions 10B each have a predetermined width W that is smaller than that of the flat plate portion 10A. The distal ends of the joint portions 10B are joined to the respective rising plates 9D of the guide plates 9. The joints between the joint portions 10B and the rising plates 9D are bent in a substantially "<" shape relative to the rotational (circumferential) direction of the disk D.

An engagement plate 11 is provided at the middle in the longitudinal direction of the flat plate portion 10A of the connecting plate 10. The engagement plate 11 is bent in a substantially "<" shape while extending downward from the flat plate portion 10A. The engagement plate 11 is engaged and secured to the radially inner side (i.e. disk pass portion) of the mounting member 1, thereby positioning the pad spring 8 with respect to the mounting member 1 in the axial direction of the disk D.

Radially urging portions 12 are provided on the respective bottom plates 9B of the guide plates 9 to urge the friction pads 7 radially outward of the disk D, thereby suppressing rattling and other undesired movement of the friction pads 7.

Each radially urging portion 12 is, as shown in FIG. 4, bent from the end of the bottom plate 9B toward the inside of the guide plate 9 in a substantially U or C shape. Thus, elastic deformation of the radially urging portion 12 allows the distal end thereof to move toward and away from the top plate 9A. As shown in FIG. 3, with resilient counterforce therefrom, the radially urging portion 12 urges the projection 7A of the friction pad 7 toward the top plate 9A of the guide plate 9, thereby resiliently supporting the projection 7A between the top plate 9A and the radially urging portion 12.

Circumferentially urging portions 13 are provided on the respective bottom plates 9B of the guide plates 9 to urge the inner and outer friction pads 7 in the rotational (circumferential) direction of the disk D. The circumferentially urging portions 13 are bent from the respective distal ends of the bottom plates 9B of the guide plates 9 obliquely radially inward of the disk D. Each circumferentially urging portion 13 is formed as a wide plate-shaped spring member bent in a "<" shape over the entire widthwise length thereof. The bent part of the circumferentially urging portion 13 is resiliently abutted against the end surface of the friction pad 7.

Claw portions 14 are provided on the respective side plates 9C of the guide plates 9. The claw portions 14 are engaged with the peripheral walls of the pad guides 2 in an elastically deformed state, whereby the guide plates 9 are held in the pad guides 2 so as not to fall off.

Reinforcement 15 is provided to extend over from the flat plate portion 10A to the joint portions 10B of the connecting plate 10, for example, to increase the strength (e.g. bending strength) and rigidity of the pad spring 8 between the inner and outer guide plates 9.

Figure 8:
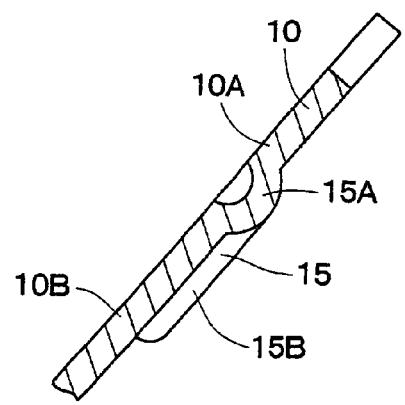
FIG. 8 is an enlarged sectional view of a connecting plate, reinforcements and so forth of the pad spring as seen in the direction of the arrow VIII-VIII in FIG. 7.

The reinforcement 15 is formed by a method, for example, embossing, at the same time when the pad spring 8 is formed by press working. As shown in FIGS. 7 and 8, the reinforcement 15 is formed as a recessed projection that is recessed and projecting relative to the connecting plate 10 (e.g. as a region having a sectional configuration projecting from one side surface of the connecting plate 10 and recessed from the other side surface as shown in FIG. 8, or as a region having a sectional configuration recessed from one side surface of the connecting plate 10 and projecting from the other side surface inversely to the configuration shown in FIG. 8).

The reinforcement 15 includes a rectilinear reinforcement 15A provided rectilinearly along the flat plate portion 10A of the connecting plate 10 and a pair of oblique reinforcements 15B, 15B obliquely extending rectilinearly from the opposite ends of the rectilinear reinforcement 15A toward the inner and outer guide plates 9. The distal ends of the pair of oblique reinforcements 15B, 15B that extend toward the guide plates 9 terminate short of the bends between the joint portions 10B and the rising plates 9D of the guide plates 9 to avoid interference with the bending operation for forming the bends.

The rectilinear reinforcement 15A reinforces the flat plate portion 10A of the connecting plate 10. The oblique reinforcements 15B reinforce the inner and outer joint portions 10B, respectively. The oblique reinforcements 15B extend to diverge from each other from the opposite ends of the rectilinear reinforcement 15A in a splayed pattern (like drooping eyebrows).

The rectilinear reinforcement 15A and the oblique reinforcements 15B are formed contiguously with each other as an integral recessed projection and bent in a substantially U shape (or "]" shape) as a whole. Consequently, the reinforcement 15 can impart high strength and rigidity to the connecting plate 10 and its vicinities by synergy of the rectilinear reinforcement 15A and the oblique reinforcements 15B.

The disk brake according to this embodiment is arranged as stated above. The disk brake operates as follows.

When the brake of the vehicle is activated, a brake fluid pressure is supplied into the cylinder 3E of the caliper 3, causing the piston 4 to be slidingly displaced toward the disk D, whereby the inner friction pad 7 is pressed against one side of the disk D. At this time, the caliper 3 receives pressing counterforce from the disk D. Therefore, the whole caliper 3 is slidingly displaced toward the inner side relative to the arms 1A of the mounting member 1. Consequently, the outer leg portion 3C presses the outer friction pad 7 against the other side of the disk D.

Thus, the inner and outer friction pads 7 can apply braking forces to the disk D from both sides thereof. When the braking operation is canceled, the supply of the fluid pressure into the cylinder 3E is stopped. Consequently, the inner and outer friction pads 7 separate from the disk D and return to their non-braking positions.

During the braking operation, the friction pads 7 may be dragged by the disk D and thus displaced in the rotational direction of the disk D, and the caliper 3 that presses the friction pads 7 may be displaced in the rotational direction by receiving counterforce from the disk D.

At this time, each pad spring 8 urges the friction pads 7 radially outward of the disk D with the radially urging portions 12, and while doing so, urges the friction pads 7 in the rotational direction of the disk D with the circumferentially urging portions 13. Therefore, if the friction pads 7 are displaced away from the disk D due to run-out of the disk D rotating at idle during non-braking operation, for example, in a state where the slidability of the friction pads 7 relative to the pad springs 8 has deteriorated with age, it is likely that external forces may be applied to the pad springs 8 according to the displacements of the friction pads 7. The external forces, for example, may urge the guide plates 9 of each pad spring 8 to move away from each other and act as forces that pull the opposite ends of the connecting plate 10 away from each other (i.e. in the directions of the arrows F, F in FIG. 5).

The connecting plate 10, however, is reinforced as a whole by the reinforcement 15. The vicinities of the joint portions 10B, in particular, are reinforced to have sufficient strength and rigidity by the oblique reinforcements 15B. Therefore, the joint portions 10B and so forth can be surely prevented from being deformed or damaged by external forces.

Thus, according to this embodiment, the connecting plate 10 of each pad spring 8 is provided with the reinforcement 15 having the rectilinear reinforcement 15A and the oblique reinforcements 15B. Therefore, the flat plate portion 10A of the connecting plate 10 can be reinforced by the rectilinear reinforcement 15A, and the joint portions 10B can be surely reinforced by the oblique reinforcements 15B.

Accordingly, even if external forces are applied from the caliper 3 or the friction pads 7 to the pad springs 8 so as to urge the guide plates 9 of each pad spring 8 to move away from each other during the operation of the disk brake, the joint portions 10B can be prevented from being distorted or deformed by the external forces. Therefore, the pad springs 8 can exhibit their functions stably for an increased period of time, and the durability and reliability thereof can be improved.

Further, the increased rigidity of the joint portions 10B and so forth can suppress deformation, positional displacement and the like of the guide plates 9. Consequently, when the brake is activated and released, the friction pads 7 can be smoothly displaced in the axial direction of the disk D along the guide plates 9, and thus it is possible to minimize the dragging torque and the like of the friction pads 7 and to improve the brake performance. Further, during assembling of the disk brake, the pad springs 8 are unlikely to be deformed even if somewhat strong force is applied thereto to assemble them into the disk brake. Accordingly, the assembling operation can be performed efficiently.

Moreover, when the pad springs 8 are formed by press working, for example, in this embodiment, it is possible to use a die or the like previously formed with a recessed projection profile for forming reinforcement. With this die, each pad spring 8 is formed, and while doing so, the reinforcement 15 having a recessed projection configuration can be formed by embossing.

Thus, the press forming of the pad spring 8 and the formation of the reinforcement 15 can be efficiently performed in the same process. Accordingly, the required strength and rigidity can be readily obtained without the need to complicate the equipment, process, etc. for forming the pad springs 8, for example. Hence, it is possible to minimize the cost increase and to increase productivity.

In addition, the connecting plate 10 and so forth of each pad spring 8 are positioned in a narrow gap S (see FIG. 3) between the arm 1A of the mounting member 1 and the caliper 3. It is often difficult in the gap S to bend the connecting plate 10 to a considerable extent in the direction of the plate thickness to ensure the required strength, for example, due to the restriction on the layout of the surrounding component parts.

Meanwhile, it is also conceivable to increase the width W (see FIG. 7) of each joint portion 10B, for example, to thereby ensure the required strength. In this case also, however, it may be difficult to widen the width W due to the restriction on the layout and so forth.

That is, the connecting plate 10 is, as shown in FIG. 1, positioned near a portion of the associated arm 1A of the mounting member 1 corresponding to the boot fitting groove 1E. This portion of the arm 1A has a larger diameter than the other portion thereof by an amount corresponding to the boot fitting groove 1E. Therefore, if the width W of the joint portion 10B located at the upper side as viewed in FIG. 1, for example, is widened, the joint portion 10B may interfere with the outer peripheral surface of the arm 1A. Thus, there are cases where it is difficult to widen the joint portion 10B.

In this regard, however, if the joint portions 10B are embossed to form oblique reinforcements 15B as in this embodiment, the strength and rigidity of the joint portions 10B can be sufficiently increased without the need to widen the width W thereof. Accordingly, it is possible to readily design the component part shape of the pad springs 8 and the layout of the components without worrying about the interference between the connecting plate 10 and the arm 1A, for example, in designing the disk brake.

Further, the reinforcement 15 is provided with the oblique reinforcements 15B obliquely extending from the opposite ends of the rectilinear reinforcement 15A. Therefore, the rectilinear reinforcement 15A and each oblique reinforcement 15B can be extended contiguously. Accordingly, the reinforcement 15 can be formed in a substantially U or "]" shape as a whole.

Consequently, the reinforcement 15 can reinforce the pad spring 8 over the entire area from the connecting plate 10 to its vicinities (i.e. the joints between the connecting plate and the inner and outer guide plates 9) by synergy of the rectilinear reinforcement 15A and the oblique reinforcements 15B. Thus, the overall bending strength and the like of these portions of the pad spring 8 can be further increased.

Figure 9:
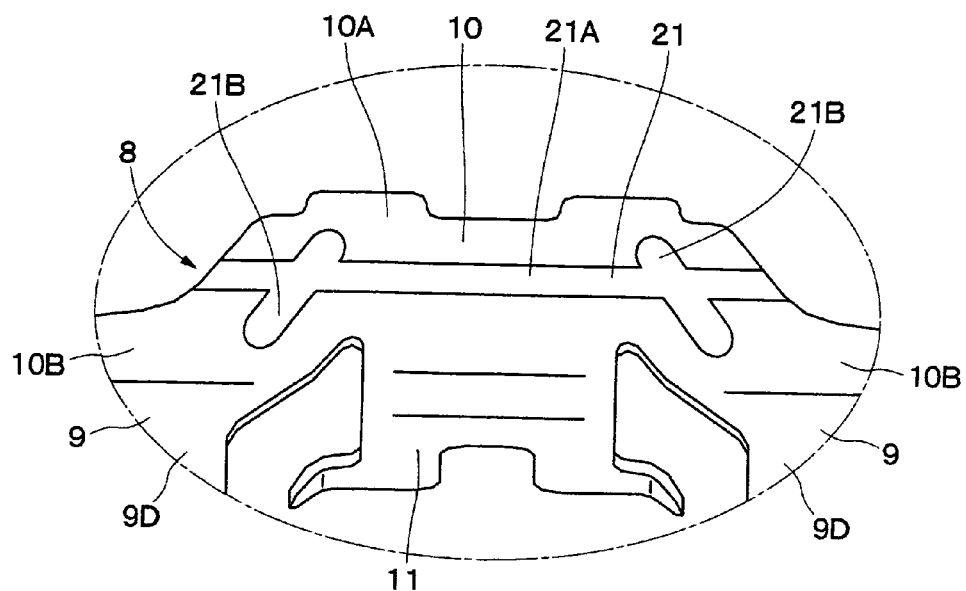
FIG. 9 is a fragmentary enlarged view of a disk brake according to a second embodiment of the present invention as seen from a position similar to that of FIG. 7.

FIG. 9 shows a second embodiment of the present invention. The feature of this embodiment resides in that the reinforcement of each pad spring has a rectilinear reinforcement and each oblique reinforcement joined together in a substantially cross-shape configuration. It should be noted that in this embodiment the same constituent elements as those in the foregoing first embodiment are denoted by the same reference numerals as used in the first embodiment, and a description thereof is omitted.

Each pad spring 8 has reinforcement 21 provided on the connecting plate 10 thereof. The reinforcement 21 is formed as a recessed projection by a method, for example, embossing, substantially in the same way as in the first embodiment. The reinforcement 21 includes a rectilinear reinforcement 21A and a pair of oblique reinforcements 21B.

The rectilinear reinforcement 21A, however, is longer than in the first embodiment, and the opposite ends thereof reach the opposite side end surfaces of the flat plate portion 10A of the connecting plate 10 beyond the positions of the oblique reinforcements 21B. The oblique reinforcements 21B are joined to the rectilinear reinforcement 21A at respective positions near the opposite ends of the latter in the state of intersecting the rectilinear reinforcement 21A in a substantially cross-shape configuration.

Thus, the second embodiment arranged as stated above can also offer substantially the same advantageous effects as those in the first embodiment. In this embodiment, in particular, the rectilinear reinforcement 21A and the oblique reinforcements 21B of the reinforcement 21 are joined in the state of intersecting each other in a substantially cross-shape configuration. Therefore, the bending strength of the joint portions 10B and their vicinities of the connecting plate 10 can be further increased.

Figure 10:
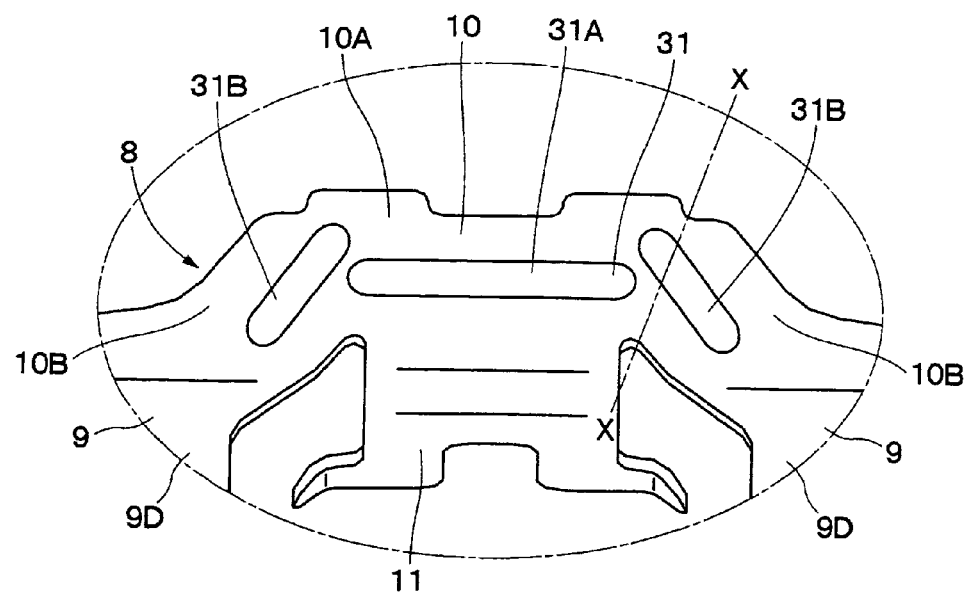
FIG. 10 is a fragmentary enlarged view of a disk brake according to a third embodiment of the present invention as seen from a position similar to that of FIG. 7.

FIG. 10 shows a third embodiment of the present invention. The feature of this embodiment resides in that the rectilinear reinforcement and the oblique reinforcements are disposed separately from each other. It should be noted that in this embodiment the same constituent elements as those in the first embodiment are denoted by the same reference numerals as used in the first embodiment, and a description thereof is omitted.

Each pad spring 8 has reinforcement 31 provided on the connecting plate 10 thereof. The reinforcement 31 is formed as a recessed projection by a method, for example, embossing, substantially in the same way as in the first embodiment. The reinforcement 31 includes a rectilinear reinforcement 31A provided on the flat plate portion 10A and a pair of oblique reinforcements 31B provided rectilinearly on the joint portions 10B, respectively.

The inner and outer oblique reinforcements 31B are, however, disposed apart from the rectilinear reinforcement 31A at an appropriate distance and formed from respective recessed projections that are separate from the rectilinear reinforcement 31A. The oblique reinforcements 31B extend as far as the flat plate portion 10A beyond a weak-strength portion (indicated by the straight line X-X in FIG. 10) at the joint between the flat plate portion 10A and each joint portion 10B. With this arrangement, the bending strength of the portion indicated by the straight line X-X can be increased.

Thus, the third embodiment arranged as stated above can also offer substantially the same advantageous effects as those in the first embodiment. In this embodiment, in particular, the rectilinear reinforcement 31A and the oblique reinforcements 31B of the reinforcement 31 are disposed separately from each other. Accordingly, the positions where the oblique reinforcements 31B are formed can be readily adjusted according, for example, to the positional relationship between the oblique reinforcements 31B and component parts installed around the pad spring 8. Hence, the design freedom can be increased.

Figure 11:
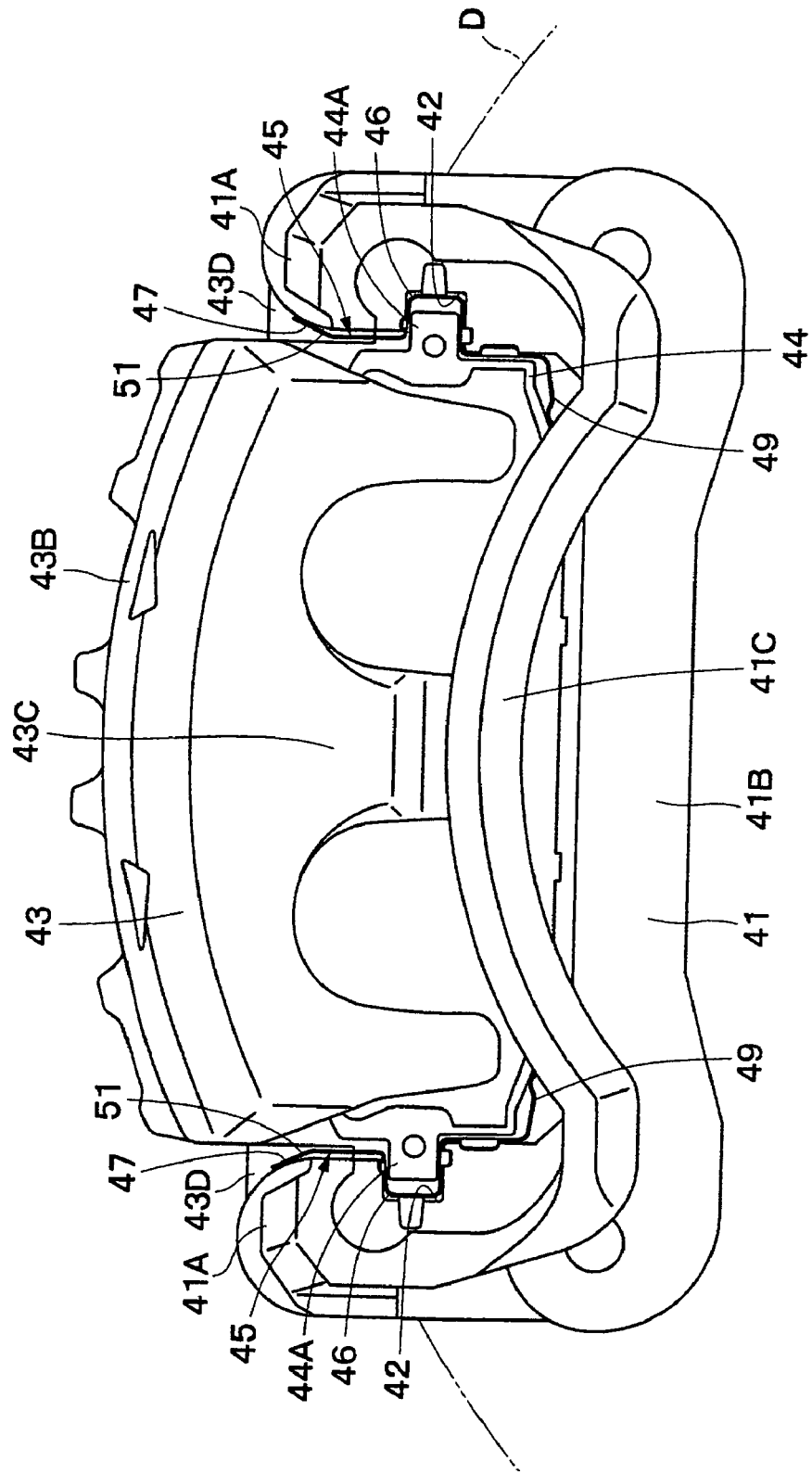
FIG. 11 is a general view of a disk brake according to a fourth embodiment of the present invention.
Figure 12:
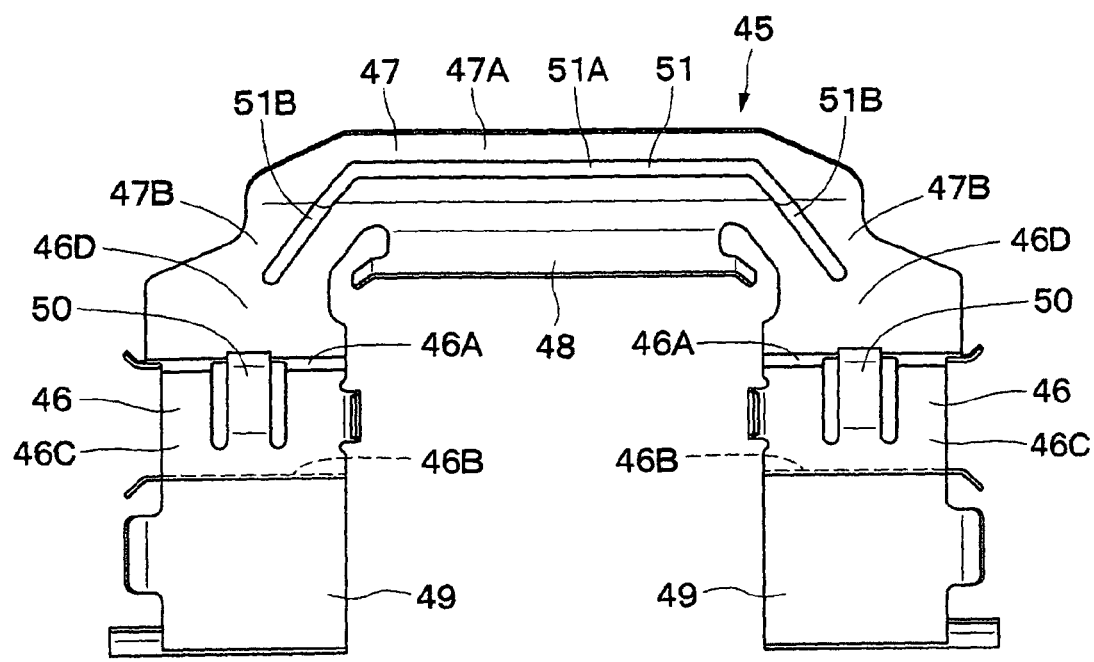
FIG. 12 is a rear view of a pad spring shown in FIG. 11.
Figure 13:
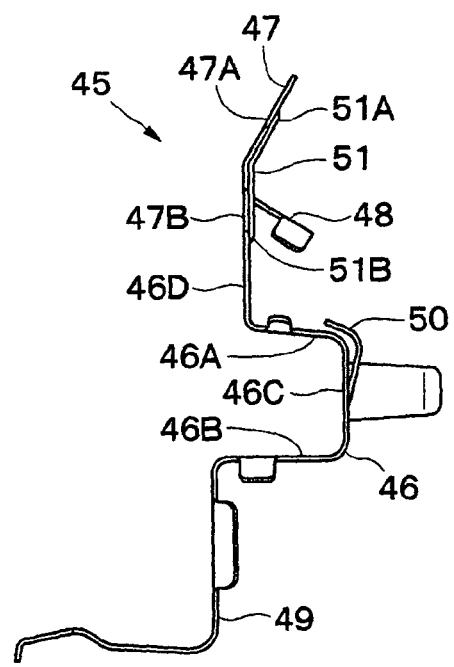
FIG. 13 is a side view of the pad spring in FIG. 12 as seen from the left side thereof.

FIGS. 11 to 13 show a fourth embodiment of the present invention. The feature of this embodiment resides in that the present invention is applied to a disk brake of the twin-bore specifications.

A mounting member 41 is secured to a non-rotating part of a vehicle. The mounting member 41 is arranged substantially in the same way as in the first embodiment. That is, the mounting member 41 has a pair of arms 41A, a mounting seat portion 41B, a reinforcing beam 41C, etc. Each arm 41A has U-groove shaped pad guides 42 positioned at the inner and outer sides, respectively, of a disk D.

A caliper 43 is slidably provided on the mounting member 41 through sliding pins (not shown). The caliper 43 has an inner leg portion (not shown), a bridge portion 43B, an outer leg portion 43C, mounting portions 43D, etc. substantially in the same way as in the first embodiment. The inner leg portion is provided with two (for example) cylinders, and pistons are slidably fitted in the cylinders, respectively.

Inner and outer friction pads 44 (only the outer friction pad is shown in FIG. 11) are disposed at the opposite sides of the disk D. Each friction pad 44 has substantially quadrangular projections 44A respectively provided at both longitudinal ends thereof substantially in the same way as in the first embodiment. The projections 44A are slidably fitted in the pad guides 42, respectively, of the mounting member 41 with guide plates 46 of pad springs 45 (described later) interposed therebetween.

A pair of pad springs 45 provided on the arms 41A, respectively, of the mounting member 41. As shown in FIGS. 12 and 13, each pad spring 45 consists essentially of guide plates 46, a connecting plate 47, an engagement plate 48, radially urging portions 49, claw portions 50, and reinforcement 51 (described later) substantially in the same way as in the first embodiment. The guide plates 46 each have a top plate 46A, a bottom plate 46B, a side plate 46C, a rising plate 46D, etc. The connecting plate 47 has a flat plate portion 47A and two joint portions 47B.

Each pad spring 45 has reinforcement 51 provided on the connecting plate 47 thereof. The reinforcement 51 is formed as a recessed projection having a substantially U or "]" shape as a whole by a method, for example, embossing, substantially in the same way as in the first embodiment. The reinforcement 51 includes a rectilinear reinforcement 51A provided on the flat plate portion 47A and a pair of oblique reinforcements 51B provided on the joint portions 47B, respectively.

The fourth embodiment arranged as stated above can also offer substantially the same advantageous effects as those in the first embodiment. Thus, the present invention is also applicable to a disk brake of the twin-bore specifications.

Figure 14:
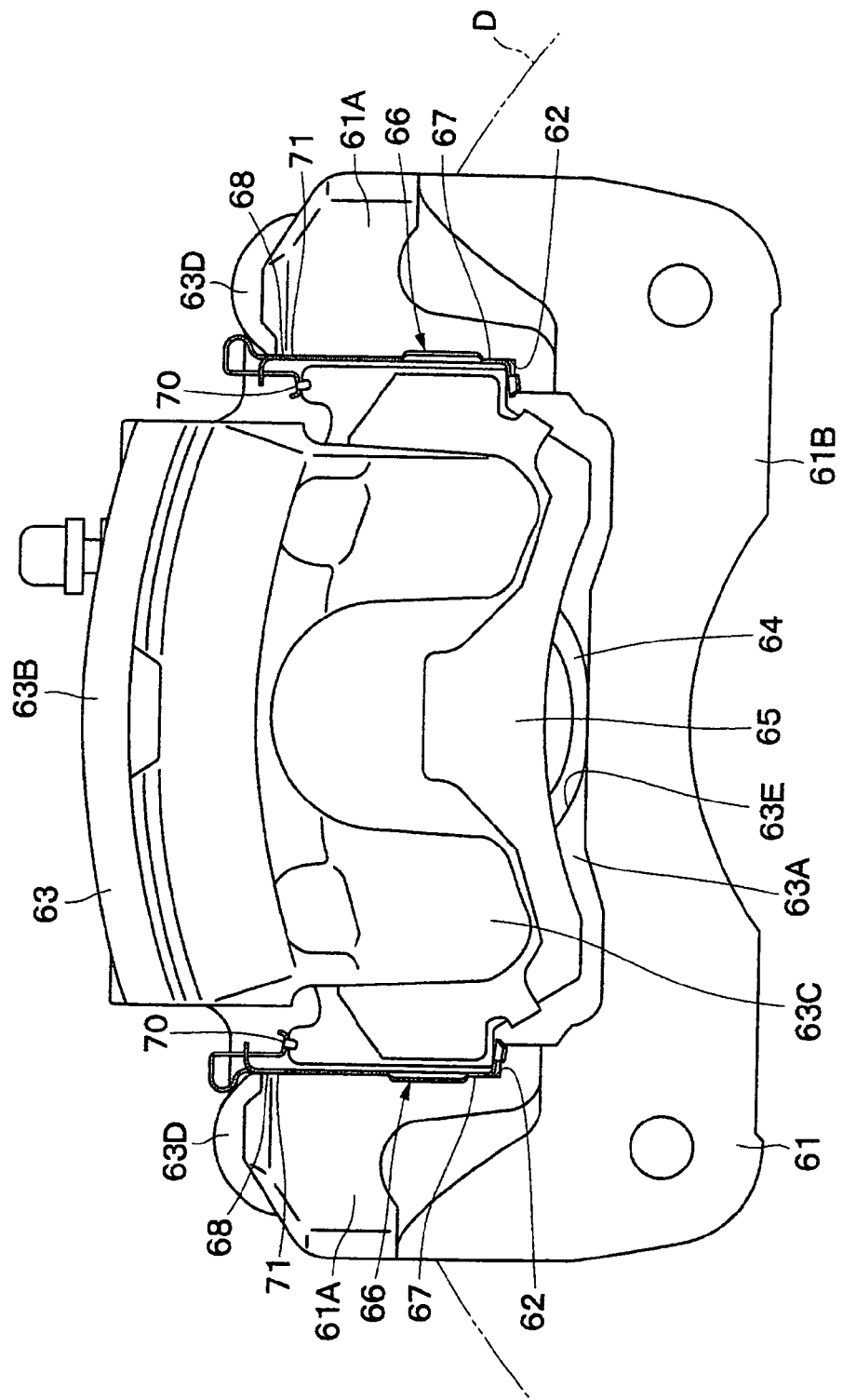
FIG. 14 is a general view of a disk brake according to a fifth embodiment of the present invention.
Figure 15:
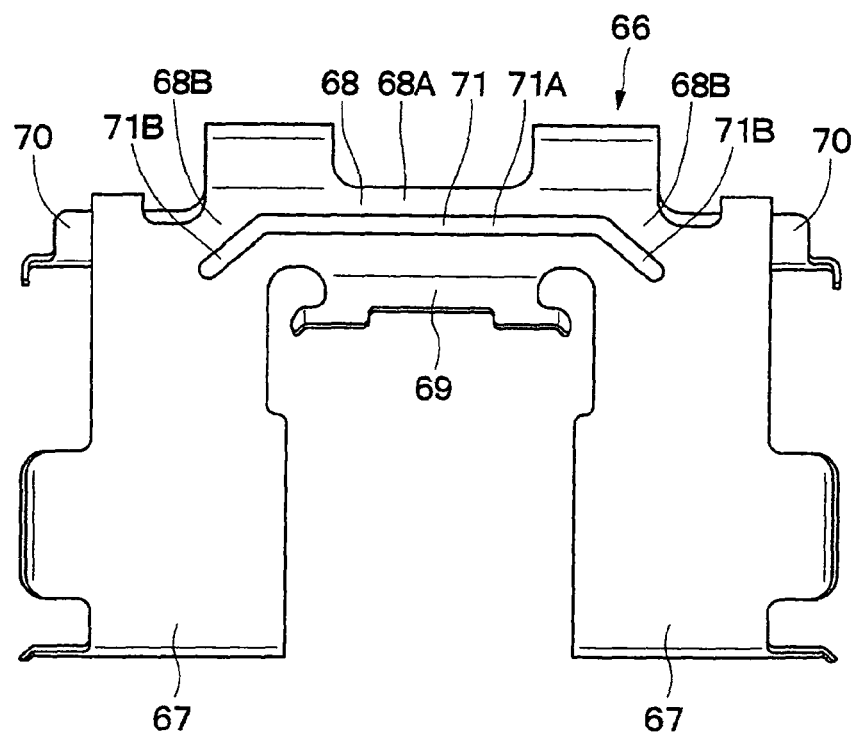
FIG. 15 is a rear view of a pad spring shown in FIG. 14.
Figure 16:
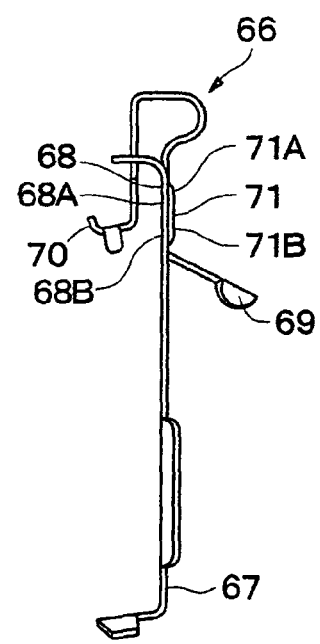
FIG. 16 is a side view of the pad spring in FIG. 15 as seen from the left side thereof.

FIGS. 14 to 16 show a fifth embodiment of the present invention. The feature of this embodiment resides in that the present invention is applied to a disk brake of specifications different from those described above.

A mounting member 61 is secured to a non-rotating part of a vehicle. The mounting member 61 is arranged substantially in the same way as in the first embodiment. That is, the mounting member 61 has a pair of arms 61A and a mounting seat portion 61B. Each arm 61A has pad guides 62 positioned at the inner and outer sides, respectively, of a disk D. The pad guides 62 are each formed as an L-shaped stepped portion, for example.

A caliper 63 is slidably provided on the mounting member 61 through sliding pins (not shown). The caliper 63 has an inner leg portion 63A, a bridge portion 63B, an outer leg portion 63C, mounting portions 63D, a cylinder 63E, etc. substantially in the same way as in the first embodiment. The cylinder 63E has a piston 64 slidably fitted therein.

Inner and outer friction pads 65 (only the outer friction pad 65 is shown in FIG. 14) are disposed at the opposite (inner and outer) sides of the disk D. The friction pads 65 are slidably supported by the pad guides 62, respectively, of the mounting member 61 with respective guide plates 67 of pad springs 66 (described later) interposed therebetween. The friction pads 65 are displaceable in the axial direction of the disk D.

A pair of pad springs 66 is provided on the arms 61A, respectively, of the mounting member 61. As shown in FIGS. 15 and 16, each pad spring 66 has guide plates 67, a connecting plate 68, an engagement plate 69, radially urging portions 70, reinforcement 71, etc., which will be described later, substantially in the same way as in the first embodiment.

A pair of guide plates 67 is provided at the axially opposite sides, respectively, of the disk D to guide the friction pads 65 in the axial direction of the disk D substantially in the same way as in the first embodiment. The guide plates 67 are bent in an L shape, for example. The outer surfaces of the guide plates are positioned along the associated pad guides 62 of the mounting member 61. The inner surfaces of the guide plates 67 are positioned along the radially inner end surfaces of the friction pads 65, for example, to resiliently support the friction pads 65 between themselves and the associated radially urging portions 70.

A connecting plate 68 is provided to connect between the inner and outer guide plates 67. The connecting plate 68 has a rectilinear flat plate portion 68A extending in the axial direction of the disk D over the outer periphery thereof and two joint portions 68B integrally formed at the longitudinally opposite ends of the flat plate portion 68A and joined to the inner and outer guide plates 67, respectively. The flat plate portion 68A has an engagement plate 69 integrally formed at the middle in the longitudinal direction thereof. The engagement plate 69 is bent in a substantially "<" shape while extending downward from the flat plate portion 68A.

Inner and outer radially urging portions 70 are provided radially outside the connecting plate 68. The radially urging portions 70 are formed as bent portions of substantially U shape, for example, and disposed at respective positions corresponding to the inner and outer friction pads 65. The distal ends of the radially urging portions 70 are folded from the connecting plate 68 radially inward of the disk D to abut resiliently against the radially outer end surfaces of the friction pads 65. Thus, the radially urging portions 70 urge the friction pads 65 radially inward and resiliently press them against the pad guides 62.

Each pad spring 66 has reinforcement 71 provided on the connecting plate 68 thereof. The reinforcement 71 is formed as a recessed projection having a substantially U or "]" shape as a whole by a method, for example, embossing, substantially in the same way as in the first embodiment. The reinforcement 71 includes a rectilinear reinforcement 71A provided on the flat plate portion 68A and a pair of oblique reinforcements 71B provided on the joint portions 68B, respectively.

Thus, the fifth embodiment arranged as stated above can also offer substantially the same advantageous effects as those in the first embodiment.

Figure 17:
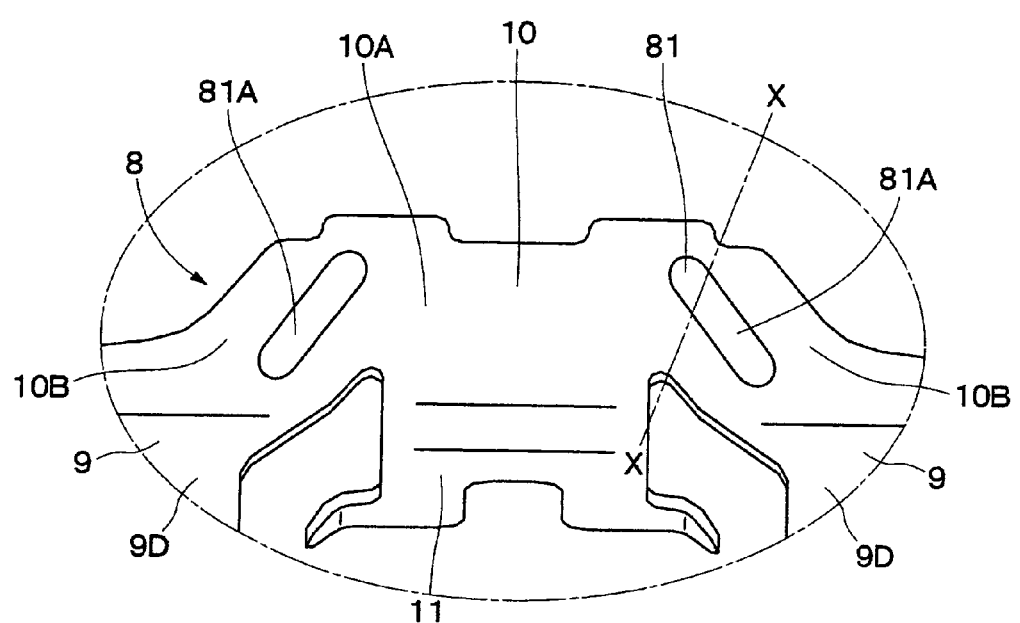
FIG. 17 is a fragmentary enlarged view of a disk brake according to a sixth embodiment of the present invention as seen from a position similar to that of FIG. 7.

FIG. 17 shows a sixth embodiment of the present invention. The feature of this embodiment resides in that the reinforcement is composed only of oblique reinforcements. It should be noted that in this embodiment the same constituent elements as those in the first embodiment are denoted by the same reference numerals as used in the first embodiment, and a description thereof is omitted.

Each pad spring 8 has reinforcement 81 provided on the connecting plate 10 thereof. The reinforcement 81 is formed as a recessed projection by a method, for example, embossing, substantially in the same way as in the third embodiment. The reinforcement 81 is, however, composed only of a pair of oblique reinforcements 81A provided on the inner and outer joint portions 10B, respectively. The rectilinear reinforcement 15A in the third embodiment is omitted in this embodiment.

Thus, the sixth embodiment arranged as stated above can also offer substantially the same advantageous effects as those in the first embodiment.

It should be noted that in the fourth and fifth embodiments the reinforcements 51 and 71 similar to the reinforcement 15 in the first embodiment are provided on the pad springs 45 and 66 for the disk brakes of the different specifications from those in the first embodiment. The present invention, however, is not necessarily limited to the described arrangement. For example, the reinforcement 21, 31 or 81 in the second, third or sixth embodiment may be provided on the pad springs 45 and 66 in the fourth and fifth embodiments.

In the foregoing embodiments, two pad springs 8, 45 or 66 disposed facing each other across the friction pads 7, 44 or 65 in the rotational direction of the disk D are denoted by the same reference numeral. It should be noted, however, that these two pad springs do not necessarily need to be formed from components of the same configuration but may be formed as components having different configurations from each other.

In the foregoing embodiments, the calipers 3, 43 and 63 are each slidably supported by the mounting member 1, 41 or 61 through two sliding pins 5 secured to the caliper. The present invention, however, is not necessarily limited to the described slidably supporting structure. For example, the caliper may be slidably supported by two sliding pins secured to the mounting member, as disclosed in Japanese Patent Application Publication No. Sho 48-41166. It is essential only that the caliper be provided on the mounting member slidably in the axial direction of the disk.

According to the foregoing embodiments, reinforcements can be provided on the joint portions (or both the flat plate portion and the joint portions) of the connecting plate of each pad spring. The reinforcements can surely reinforce at least the joint portions and their vicinities. Thus, the strength and rigidity of the pad spring between a pair of guide plates can be sufficiently increased without the need to increase the outside dimensions (width and so forth) of the joint portions, for example. Therefore, even if external forces are applied from the caliper or the friction pads to the joint portions of the pad springs in directions in which the joint portions are pulled away from each other during the operation of the disk brake, for example, the joint portions can be prevented from being elastically deformed by the external forces.

Accordingly, the pad springs can exhibit their functions stably for an increased period of time, and the durability and reliability thereof can be improved. Further, the increased rigidity of the joint portions can suppress deformation, positional displacement and the like of the guide plates. Consequently, the friction pads can be smoothly displaced along the guide plates, and hence it is possible to minimize the dragging torque and the like of the friction pads and to improve the brake performance. Further, during assembling of the disk brake, the pad springs are unlikely to be deformed even if somewhat strong force is applied thereto to assemble them into the disk brake. Accordingly, the assembling operation can be performed efficiently.

Moreover, when the pad springs are stamped from a plate material, for example, it is possible to use a die or the like previously formed with a recessed projection profile for forming reinforcement. With this die, each pad spring is formed, and while doing so, reinforcement having a recessed projection configuration can be formed on the connecting plate by embossing. Thus, the stamping of the pad springs and the formation of the reinforcement can be efficiently performed in the same process.

Accordingly, the required strength and rigidity can be readily obtained without the need to complicate the equipment, process, etc. for forming the pad springs, for example. Hence, it is possible to minimize the cost increase and to increase productivity. Further, the use of embossing enables a high strength to be obtained without the need to increase the outside dimensions (width and so forth) of the joint portions or to provide bent regions or the like on the joint portions, for example. Accordingly, even when the pad springs are each installed in a narrow gap between the mounting member and the caliper, for example, reinforcement that will not interfere with the surrounding component parts can be formed easily, and the component part shape and the layout components can be designed smoothly.

The connecting plate of each pad spring can be provided with reinforcement continuously extending over from the flat plate portion to the joint portions, for example. Alternatively, discrete reinforcements can be provided on the flat plate portion and the joint portions, respectively. Thus, the connecting plate can be reinforced as a whole by the reinforcement, and the strength and rigidity of the pad spring can be increased even more surely.

The rectilinear reinforcement and the oblique reinforcements extend in a substantially U or "]" shape as a whole. Consequently, the connecting plate of the pad spring can be surely reinforced entirely by synergy of the rectilinear reinforcement and the oblique reinforcements, and the strength and rigidity of the pad spring between a pair of guide plates can be further increased.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2006-126882 filed on Apr. 28, 2006 including specification, claims, drawings and summary is incorporated herein by reference in its entirety.

What is claimed is:

1. A disk brake comprising:
    a mounting member configured to be secured to a non-rotating part of a vehicle, said mounting member having first and second arms spaced apart from each other in a rotational direction of a disk, each of said first and second arms extending over an outer periphery of the disk in an axial direction of the disk, and said first and second arms including first and second pad guides, respectively;
    a caliper slidably disposed on said mounting member in the axial direction of the disk;
    first and second friction pads slidably fitted to said first and second arms of said mounting member, respectively, through said first and second pad guides, respectively, each of said first and second friction pads being configured to be pressed against a respective side of the disk by said caliper; and
    first and second pad springs attached to said first and second arms of said mounting member, respectively, to resiliently support said first and second friction pads, respectively, between said first and second arms;
    wherein each of said pad springs comprises:
        first and second guide plates positioned in one of said pad guides of said mounting member at axially opposite sides of the disk to guide one of said friction pads in the axial direction of the disk;
        a connecting plate having a flat plate portion extending in the axial direction of the disk over the outer periphery thereof and first and second joint portions located at opposite ends of said flat plate portion and joined to said first and second guide plates, respectively, said flat plate portion extending in an extension direction; and
    first and second reinforcements disposed on at least said first and second joint portions, respectively, of said connecting plate, each of said first and second reinforcements extending at an angle relative to the extension direction of said flat plate portion, and said first and second reinforcements extending from opposite sides of said flat plate portion toward said first and second guide plates, respectively, to reinforce said joint portions.

2. A disk brake according to claim 1, wherein said reinforcements are formed from recessed projections.

3. A disk brake according to claim 1, wherein each of said first and second reinforcements is disposed on said flat plate portion and said first and second reinforcements are disposed on said first and second joint portions of said connecting plate, respectively.

4. A disk brake according to claim 3, wherein each of said reinforcements includes a rectilinear reinforcement rectilinearly disposed on said flat plate portion of said connecting plate and first and second oblique reinforcements disposed on said first and second joint portions of said connecting plate, respectively, to extend obliquely from opposite ends of said rectilinear reinforcement toward said first and second guide plates.

5. A disk brake according to claim 2, wherein each of said first and second reinforcements is disposed on said flat plate portion and said first and second reinforcements are disposed on said first and second joint portions of said connecting plate, respectively.

6. A disk brake according to claim 5, wherein each of said reinforcements includes a rectilinear reinforcement rectilinearly disposed on said flat plate portion of said connecting plate and first and second oblique reinforcements disposed on said first and second joint portions of said connecting plate, respectively, to extend obliquely from opposite ends of said rectilinear reinforcement toward said first and second guide plates.

7. A disk brake according to claim 2, wherein each of said first and second reinforcements is disposed obliquely to the axial direction of the disk.

8. A disk brake according to claim 7, wherein said reinforcements each extend in a belt shape.

9. A disk brake comprising:
a mounting member configured to be secured to a non-rotating part of a vehicle, the mounting member having a first and second arms spaced apart from each other in a rotational direction of a disk, each of said arms extending over an outer periphery of the disk in an axial direction of the disk, and said first and second arms being provided with first and second pad guides, respectively;
a caliper disposed on said mounting member slidably in the axial direction of the disk;
first and second friction pads slidably fitted to the first and second arms of said mounting member, respectively through said first and second pad guides, respectively, each of said first and second friction pads being configured to be pressed against a respective side of the disk by said caliper; and
first and second pad springs attached to said first and second arms of said mounting member, respectively, to resiliently support said first and second friction pads between said first and second arms;

wherein each of said pad springs comprises:
first and second guide plates positioned in one of said pad guides of said mounting member at axially opposite sides of the disk to guide said one of said friction pads in the axial direction of the disk;
a connecting plate having a flat plate portion extending in the axial direction of the disk over the outer periphery thereof and first and second joint portions located at opposite ends of said flat plate portion and joined to said first and second guide plates, respectively; and
first and second reinforcements disposed on at least said first and second joint portions, respectively, of said connecting plate, and said first and second reinforcements disposed obliquely to the axial direction of the disk to reinforce said joint portions.

10. A disk brake according to claim 9, wherein said reinforcements each extend in a belt shape.

11. A disk brake according to claim 9, wherein said reinforcements are formed from recessed projections.

* * * * *